Dec. 13, 1949　　　G. C. KELLAHER ET AL　　　2,490,907
PIPE COUPLER
Filed Nov. 5, 1945

INVENTORS
GILLIS C. KELLAHER
& CARL ELSASSER
BY
Charles M Fryer
ATTORNEY.

Patented Dec. 13, 1949

2,490,907

UNITED STATES PATENT OFFICE 2,490,907

PIPE COUPLER

Gillis C. Kellaher and Carl Elsasser, Portland, Oreg., assignors to R. M. Wade & Co., Portland, Oreg., a corporation of Oregon Application November 5, 1945, Serial No. 626,648

7 Claims. (Cl. 285—163)

This invention relates to pipe couplers and particularly to a kind of coupler generally employed for irrigating pipe and the like with which a non-rigid fluid tight and quickly made joint is desired.

In Patent No. 2,244,396 for "Pipe coupler," issued to Gillis C. Kellaher on June 3, 1941, there is disclosed a coupler of the kind to which the present invention pertains. As related in said patent, pipe employed for sprinkling, irrigating and other purposes is often laid over the surface of the ground and frequently moved from place to place. Consequently, it is desirable to provide coupling means which permit of the pipe sections being quickly and easily attached and detached. Coupling means used in such a pipe line must be fluid tight but are preferably sufficiently loose or flexible to permit the pipe to follow irregular terrain and follow gradual curves. All this is accomplished as, for example, by the structure shown in Patent No. 2,244,396 which employs a pipe coupler, the body of which is considerably larger in diameter than the pipe itself and which provides within the coupler a flexible gasket which forms a seal with a pipe end thrust into the coupler even though the pipe and coupler may not be perfectly aligned.

The present invention relates to such couplers and especially to the gaskets which form a seal between the pipe and coupler. It is an object of this invention to provide an inexpensive, durable and easily assembled coupler having the desired qualities herein mentioned and also to provide a gasket for such couplers which is simple in design, efficient in its function and readily replaceable when it becomes worn or broken. Further objects and advantages of the invention are made apparent in the following specification wherein reference is made to the accompanying drawings which illustrate the invention.

Figure 1:
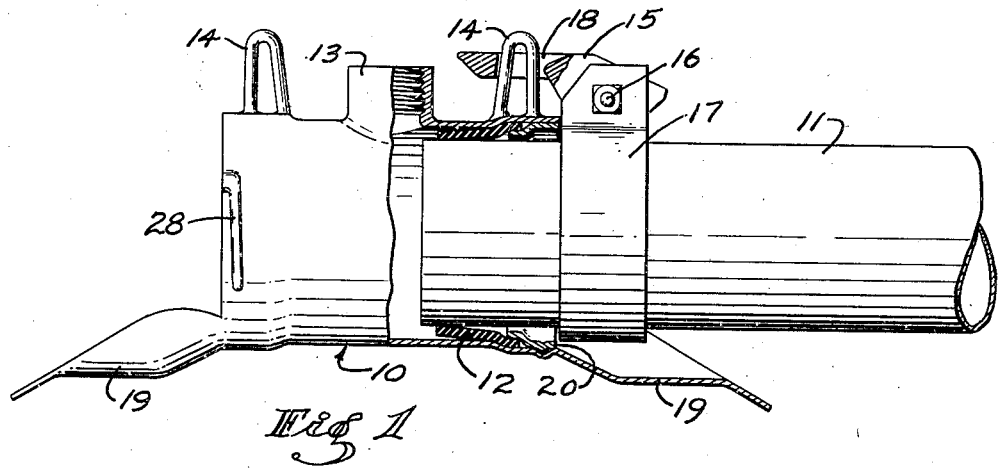
Fig. 1 is a side elevation of a pipe coupler which embodies the present invention, one-half of the coupler being shown in section and with the end of the pipe extending thereinto in coupled position.

Referring first to Fig. 1 of the drawing, a coupling member is generally indicated at 10 as a tubular casing into both ends of which the ends of pipes such as indicated at 11 may be inserted to provide for the continuous flow of water or other fluid through sections of pipe which form a pipe line. A gasket 12 is provided in each end of the coupling member 10 to form a fluid tight seal between the coupler and the end of the pipe which extends into it. The particular coupler herein shown is provided with a threaded outlet 13 with which may be connected a sprinkler or branch pipe leading toward any suitable point of discharge. The coupler is also provided with a pair of projecting loops or keepers 14 each of which cooperates with a latch 15. The latch 15 is pivotally secured adjacent the end of the pipe 11 as by a bolt 16 which serves also to secure in place a split collar 17 embracing the pipe 11 adjacent its end. The collar 17 serves to limit the distance that the end of the pipe may be inserted into the coupler, and the pivoted latch 15 has an eye 18 which falls over the keeper 14 to secure the pipe against accidental withdrawal from the coupler. The latch 15 and keeper 14 are so designed and positioned that upon insertion of the pipe into the coupler the latch automatically rides over the loop and assumes the locking position illustrated in Fig. 1.

The coupler 10 is also shown as provided with a pair of aprons 19, one of which extends from each of its opposite lower edges. These aprons serve both to support the coupler in a position slightly elevated with relation to the ground and to provide a convenient approach upon which the end of the pipe may rest before it is inserted into the coupler as well as a guide for the pipe. This is an advantage in that it often serves to prevent the end of the pipe from striking the ground and becoming fouled with dirt just before it is inserted into the coupler.

The gasket 12 which forms a seal between the pipe end and the coupler is formed of rubber or similar flexible material and when in position is tapered inwardly with relation to the coupling so that as the pipe is inserted its end fits snugly within the inner surface of the gasket. Thus, a fluid tight connection is quickly and automatically made simply upon insertion of the pipe. It has heretofore been common practice to mold such gaskets to a desirable shape and to provide retaining means usually in the form of two or more parts to hold them in proper position with relation to the coupler. The present invention eliminates difficulties by providing a normally cylindrical resilient gasket which need not be of molded construction but which will be placed in a pipe engaging position by the use of a readily removable retaining ring. To accomplish this the present invention provides a retaining ring shown at 20 for holding the gasket in place. To accommodate the retaining ring 20 the ends of the coupler 10 are swaged or enlarged as indicated at 21 in Fig. 2 and this enlargement provides an inclined or tapered portion 23 between the normal diameter of the coupler and its enlarged end. The retaining ring 20 is also enlarged adjacent one end to provide a portion 24 of large diameter and a portion 25 of smaller diameter connected with the portion 24 by a taper 26. The large portion 24 of the retainer ring fits snugly within the enlarged portion 21 of the coupler and is adapted to be connected therewith by means of projections 27 which are preferably three or more in number equally spaced about its periphery and arranged to register with bayonet grooves 28, see Fig. 1, which are disposed about the peripheries of the enlarged ends 21 of the coupler. Thus, by inserting the retainer ring in the end of the coupler with its projections 27 registering with the grooves 28 and turning it, it is advanced into the coupler in a manner similar to that of a threaded connection until it occupies the position illustrated in Fig. 2.

Figures 2, 3:
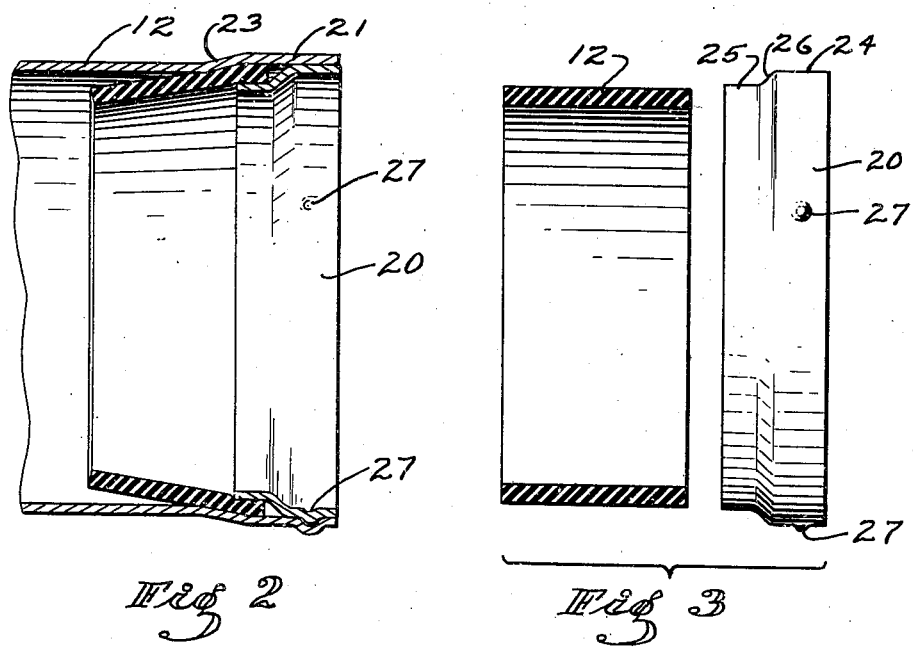
Fig. 2 is an enlarged fragmentary view in section of a portion of the pipe coupler with the pipe removed.
Fig. 3 is a view showing a gasket in section and a gasket retaining ring in side elevation, both being removed from the assembled structure illustrated in Fig. 2.

The gasket 12 is, as illustrated in Fig. 3, a simple tubular flexible member which is less costly to construct than conventional molded gaskets and, when combined with the retainer ring 20 and coupler 10, assumes a shape in which it is adapted to perform its intended function. As shown in Fig. 3, the inner diameter of the gasket 12 is considerably smaller than the outside diameter of the small portion 25 of the retainer ring. In order to assemble the gasket and the retainer ring in their position of use within the gasket, the gasket is first stretched over the small portion 25 of the ring and the ring is then inserted in the end of the coupler and turned so as to be advanced inwardly and locked against removal by longitudinal movement. The retainer ring is so positioned that, upon its insertion with the gasket in place, the outer diameter of the gasket is pressed against the tapered portion 23 of the coupler. The pressure of this connection forms a perfect seal between the retainer ring and the coupler; and the stretching of the gasket to cause it to fit over the retainer ring, together with its engagement with the tapered surface 23, imparts to it the tapered shape illustrated in Fig. 2. This causes it to engage the outer periphery of the pipe end which is inserted into the coupler in the desired manner illustrated in Fig. 1 wherein it forms a seal with such pipe end even though the pipe is not in perfect axial alignment with the coupler.

The parts herein disclosed may be made of any suitable material and may be constructed by any conventional methods. The structure shown, however, permits of the coupler 10 and retainer ring 20 being formed of sheet metal or similar material which is readily swaged or shaped to the form shown and in which the projections 27 and bayonet groove 28 may be formed by an inexpensive pressing or stamping operation. The retainer ring 20 which constitutes a single member serving both to shape and secure the simple gasket in place may be inserted and removed by any tool such as an expanding wrench. Consequently, the gasket which is easily inserted may as easily be removed and replaced if it becomes worn or broken during use; and the coupler herein shown provides all the advantages of more costly and complicated couplers heretofore employed for this type of service.

While the gasket and retainer ring are herein shown as applied to a specific type of coupler member, it will be apparent from the foregoing description that they are readily applicable to L shaped or T shaped fittings. They may also be employed in an enlarged end of a pipe section to permit the insertion of the end of an adjacent pipe section without the use of an intermediate coupler member.

We claim:

1. A pipe coupler comprising a member adapted to receive a pipe end, a flared end on said member, a cylindrical gasket in said member arranged to embrace the pipe end, and a retainer ring insertable in said flared end to compress the gasket against the flared portion thereof to effect contraction of the gasket where it receives the pipe end.

2. A pipe coupler comprising a member adapted to receive a pipe end, a normally cylindrical resilient gasket contained by said member in a position to surround the pipe end, and a retainer ring having a portion of greater diameter than the normal inside diameter of the gasket to be inserted in one end of the gasket whereby the gasket will be contracted at its opposite end to form a seal with the pipe end.

3. A pipe coupler comprising a member adapted to receive a pipe end, a normally cylindrical resilient gasket contained by said member in a position to surround the pipe end, and a retainer ring having a portion of greater diameter than the normal inside diameter of the gasket to be inserted in one end of the gasket whereby the gasket will be contracted at its opposite end to form a seal with the pipe end and means to secure the retainer ring with relation to said member.

4. A pipe coupler comprising a cylindrical member having a flared open end, a normally cylindrical resilient gasket disposed within said end, a retainer ring insertable in said end and having a portion fitting into said gasket to compress an end of the gasket against the flared inner surface of said member whereby a seal is formed and the gasket is flexed to a tapered contour.

5. A pipe coupler comprising a cylindrical member having a flared open end, a normally cylindrical resilient gasket disposed within said end, a retainer ring insertable in said end and having a portion fitting into said gasket to compress an end of the gasket against the flared inner surface of said member whereby a seal is formed and the gasket is flexed to a tapered contour and means for connecting the retainer ring to the cylindrical member.

6. A pipe coupler comprising a cylindrical member having a flared open end, a normally cylindrical resilient gasket disposed within said end, a retainer ring insertable in said end and having a portion fitting into said gasket to compress an end of the gasket against the flared inner surface of said member whereby a seal is formed and the gasket is flexed to a tapered contour and a bayonet type connection between the retainer ring and said cylindrical member.

7. A pipe coupler comprising a cylindrical member adapted to receive a pipe end and having a flared portion to provide an enlarged receiving end and an internal tapered surface, a retaining ring having a portion of large diameter receivable within said enlarged receiving end and having a portion of smaller diameter extending toward said internal tapered surface, and a gasket embracing said portion of smaller diameter and urged into contact with the tapered surface upon inserting of the retaining ring into said receiving end.

GILLIS C. KELLAHER.
CARL ELSASSER.

REFERENCES CITED

The following references are of record in the file of this patent:

UNITED STATES PATENTS

| Number | Name | Date |
|---|---|---|
| 937,533 | Kelly et al. | Oct. 19, 1909 |
| 1,580,462 | Woodruff | Apr. 13, 1926 |

FOREIGN PATENTS

| Number | Country | Date |
|---|---|---|
| 401,318 | Great Britain | Nov. 6, 1933 |